May 16, 1967 C. LIEBERMAN 3,320,051
PROCESS FOR RECOVERING AND REFINING SCRAP MATERIAL
Filed Jan. 21, 1965
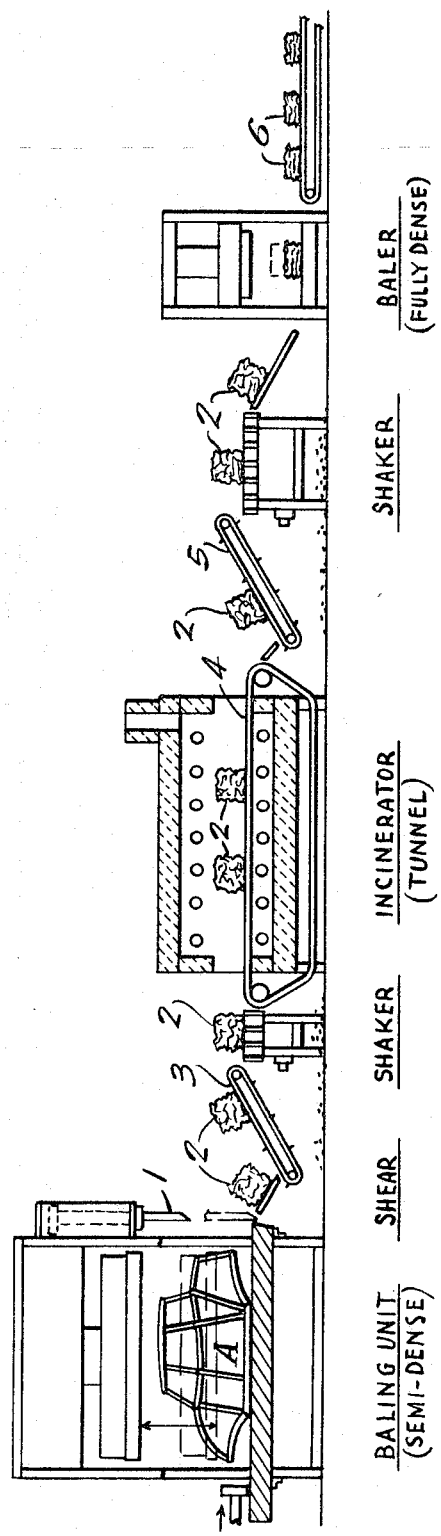
INVENTOR:
CALVIN LIEBERMAN.
BY
ATT'YS.

United States Patent Office 3,320,051
Patented May 16, 1967

3,320,051
PROCESS FOR RECOVERING AND REFINING SCRAP MATERIAL
Calvin Lieberman, 2818 Meadowwood Drive, Toledo, Ohio 43606
Filed Jan. 21, 1965, Ser. No. 426,958
8 Claims. (Cl. 75—43)

This invention relates to a process for recovering and refining metallic or ferrous scrap material from a scrap source which includes a mixture of metallic or ferrous scrap as well as nonmetallic, combustible contaminants. More specifically, this invention relates to a process for recovering and refining ferrous scrap material from scrapped or junked automobile bodies whereby the ferrous scrap recovered thereby may be melted for use in the manufacture of steel.

Scrapped or junked automobile bodies are a primary source of scrap steel which is used separately or along with pig iron in the manufacture of steel. In preparing the ferrous scrap material in an automobile body for melting in an electric furnace or copula, it is necessary first to reduce the size and increase the density of the body to facilitate handling, shipment, and melting and second to remove nonferrous and combustible contaminants. Because most sources of ferrous scrap material, particularly automobile bodies, contain relatively large amounts of nonferrous, combustible materials such as seat cushions, rubber matting, hoses, etc., it is necessary to manually remove or to incinerate such combustible materials to provide scrap which is substantially pure ferrous material and is acceptable for direct melting at the foundry or electric furnace. By far the most time consuming and expensive step in recovering the ferrous scrap from an automobile body is the manual removal of burning out of the combustible contaminants therein. While manual removal of combustible contaminants is both time consuming and expensive, the alternative of openly burning the automobile is disadvantageous in that it is relatively slow and also, because of incomplete combustion of the combustible materials, is a source of air pollution. Furthermore, such open burning may be prohibited by municipal air pollution ordinances, etc. which in effect require scrap yards to be located out of metropolitan areas and thus remote from the primary sources of scrap.

A preferred practice for removing combustible contaminants has been to incinerate the automobile bodies in an enclosed type incinerator at a high temperature with additional amounts of forced air provided to insure complete combustion and reduce air pollution. This solution has not been entirely satisfactory due to the fact that, because of the size of an automobile body, the enclosed incinerator is necessarily of a very large size and requires excessive amounts of fuel or power to maintain a high combustion temperature in a chamber large enough to admit an automobile body.

The above disadvantages may be eliminated through the use of a process in which the automobile or other large sources of ferrous scrap material are partially compacted and reduced in size prior to the incineration step which removes the combustible contaminants therefrom.

It is therefore an object of this invention to provide a method of refining and recovering metallic or ferrous scrap material in which the bodies of contaminated scrap are partially compacted to reduce their physical size whereby they may be completely incinerated within a small, tunnel type incinerator in which the combustible contaminants are completely volatilized or reduced to ash, which ash is subsequently removed by mechanical agitation from the scrap bodies to provide a substantially pure, high density scrap bale.

It is another object of this invention to provide a method of recovering and refining ferrous scrap material from a source containing combustible matter in which the impure scrap bodies are reduced in size by a conventional baling shear, are incinerated in an enclosed, tunnel-type furnace to completely combust the combustible contaminants therein, and in which the ash residue therefrom may be removed from the incinerator bodies by means of mechanical agitation.

It is yet another object of this invention to provide a method of recovering and refining scrap material in which the ferrous scrap from automobile bodies may be quickly and economically separated from the combustible contaminants therein and reduced in size to form high density bundles of substantially pure ferrous materials.

Other objects and advantages of the invention will be apparent from the following detailed description of a preferred embodiment thereof, reference being made to the sole figure of the drawing which schematically illustrates an apparatus for carrying out the process of this invention of recovering and refining scrap materials.

Referring to the sole figure, a conventional baling shear is shown with an automobile body A in a position prior to the initial compaction thereof. It may be desirable, in cases where the scrap product must be substantially free of nonferrous, noncombustible contaminants such as copper, etc., to strip the body A of such contaminants prior to subjecting it to the baling shear.

In the baling shear, the body A is crushed and partially compacted to form an elongate package which includes the ferrous scrap as well as the combustible contaminants normally present in such a scrap source. The elongate package is then rammed past the shear blade 1 which chops it into a plurality of bales 2 which are deposited on a conveyer 3.

In the process of this invention, it is important that the initial compaction by the baling shear is such that the bales 2 are of a physical dimension small enough to be received by an enclosed tunnel incinerator, and yet be of a density or degree of compaction such that the ash residue from the combustible materials within the bale, after incineration, may be removed by mechanical agitation. Therefore the degree of compaction by the baling shear should not be complete but rather only enough to produce the bundles 2 of a size which may be conveyed to and received by the tunnel incinerator.

Prior to entering the tunnel incinerator, it may be desirable to shake or mechanically agitate the bales by a shaker or other means to remove loose items (such as broken glass, etc.) prior to incineration. However, this step may be omitted and the bales 2 may be conveyed from the baling shear directly to the tunnel incinerator.

A conventional tunnel incinerator is shown with a conveyor 4 extending therethrough for moving the compacted bales 2 through the fire chamber. As previously stated, the tunnel incinerator, because of the relatively small size of the fire chamber, may be economically operated at a high temperature sufficient to completely combust all combustible material within the compacted bale 2, thus eliminating problems of smoke control and air pollution. Furthermore, the small fire chamber or tunnel can be temperature controlled by electronic controls and, with the forced introduction of sufficient air and oxygen, will eliminate the necessity for using after burners, wet scrubbers, or electric precipitators usually necessary to reduce smoke. The temperature maintained in the incinerator should be high enough to volatilize or reduce to ash all paints, undercoatings, rubber and other combustible contaminants.

As previously explained, the bales 2 are of a loosely compacted nature, and therefore the incinerator heat is directly conveyed by convection to the combustible contaminants within the interior of the bales 2 and it is not necessary to rely upon heat transfer by conduction from the exterior to the interior of the bale for the combustion of these interior contaminants. Furthermore, the forced air supply to the interior of the incinerator will be directed by convection to the interior portions of the loosely compacted bundles 2 to insure complete combustion of the contaminants therein. It has been found, using the process heretofore described, that complete combustion of the contaminants within the loosely compacted bales 2 will take place within a tunnel incinerator in fifteen to twenty minutes at a temperature in excess of 1500° as opposed to a much longer time when the automobile body or other source of scrap material is openly burned under atmospheric conditions.

After complete combustion, the loosely compacted bundles 2 leave the tunnel incinerator and are conveyed by a conveyor 5 to a second shaker or other mechanical agitator which agitates them to remove, by gravity, the residual ashes therein. Because of the fact that the bales 2 are loosely compacted, there are no incapsulated pockets or noncommunicating voids within the bundles to trap ash residue therein. Therefore, agitation of the incinerated bales 2 will remove substantially all of the residual ash, leaving a loosely compacted bale 2 of substantially pure ferrous or metallic scrap.

The final step in the recovery process is a second compacting or crushing step of the incinerated bales 2 in a conventional baler to further reduce their size and increase their density. After treatment by the baler, the fully compacted bundles 6 are conveyed to a loading station for shipment to the steel mill.

As previously stated, the advantage of the scrap recovery and refining process heretofore described lies in the fact that the combustible material in the scrap source may be completely incinerated within a conventional tunnel incinerator, the use of which is made possible by the initial compacting step which reduces the size of the scrap and yet retains the ability to mechanically remove, by agitation, the residual ash remaining after incineration. Heretofore, it has been necessary to either attempt to burn the automobile body in the open to provide for the removal of the residual ash or to completely shred the bodies by means of an expensive hammer mill and then magnetically separate the ferrous materials from the shredded combustible matter. Such shredding process, as is disclosed in United States Patent 2,943,930, while capable of reducing the size of the scrap to that which can be handled by the tunnel incinerator, is less desirable in certain instances than the process of this invention. The shredder, such as a hammer mill, is an immense and expensive piece of machinery and necessarily adds to the time required to process an automobile body. Furthermore, the shredded scrap produced thereby is not handled with the facility that the partially compacted and sheared bales 2 produced by the conventional baling shear. For this reason, the process of this invention is desirable in that it utilizes conventional equipment to produce a plurality of highly dense, compact bundles of substantially pure ferrous or metallic material.

Various modifications of the above described process will be apparent to those skilled in the art and it is to be understood that such modifications can be made without departing from the scope of the invention if within the spirit and tenor of the accompanying claims.

I claim:

1. A method of recovering and refining ferrous scrap material from automobiles comprising the steps of removing nonferrous, noncombustible components from an automobile body, partially compacting said body into an elongate package of reduced dimension and increased density, shearing said elongate package to form a plurality of scrap bales, passing said plurality of bales through a tunnel incinerator whereby the combustible matter therein is completely volatilized or reduced to ash, mechanically agitating said incinerated bales to remove the residual ash therein, and further compacting said bales to provide high density bundles of substantially pure ferrous scrap.

2. A method of recovering and refining ferrous scrap material from automobiles comprising the steps of partially compacting an automobile body into an elongate package of increased density and of a reduced dimension whereby said package may be conveyed to and received by an enclosed tunnel incinerator, shearing said elongate package to form a plurality of scrap bales, passing said bales through said incinerator wherein the combustible matter in said bales is completely volatilized or reduced to ash, agitating said bales to remove the residual ash therefrom and further compacting said bales to provide high density of substantially pure ferrous scrap.

3. A method of recovering and refining ferrous material from automobiles comprising the steps of removing noncombustible, nonferrous components from an automobile body, compacting and shearing said body by means of a baling shear to form scrap bales of increased density and of a reduced size capable of being conveyed to and received by an enclosed tunnel incinerator, conveying said scrap bales through said tunnel incinerator and agitating said bales therein whereby the combustible matter is volatilized or reduced to ash and the residual ash in said bales is separated therefrom by said agitation, and further compacting said incinerated bales to form high density bundles of substantially pure ferrous scrap.

4. A method of recovering and refining ferrous scrap material from a scrap source including ferrous material and combustible matter comprising the steps of partially compacting and shearing a scrap body in a baling shear to form a plurality of scrap bales of increased density and of a reduced size capable of being conveyed to and received by a tunnel incinerator, agitating said bales to remove loose nonferrous contaminants therefrom, passing said bales through said tunnel type incinerator whereby the combustible contaminants therein are completely volatilized or reduced to ash, further agitating said incinerated bales to remove residual ash therein, and further compacting said bales to provide high density bundles of substantially pure ferrous scrap material.

5. The process of claim 4 in which the initial compaction of said plurality of bales prior to incineration, is such that said bales, after incineration, are characterized by an absence of entrapped ashes in noncommunicating pockets within the interior of said bales.

6. A method of recovering and refining ferrous scrap material from automobile bodies comprising the steps of removing nonferrous, noncombustible materials from an automobile, placing said body in a baling shear and compacting said body to form an elongate package of increased density and of reduced dimensions, shearing said elongate package to form a plurality of scrap bales of a size capable of being conveyed to and received by a tunnel incinerator, conveying said plurality of bales through said tunnel incinerator wherein the combustible contaminants therein are completely volatilized or reduced to ash, agitating said incinerated bales to remove the residual ash therefrom, and further compacting said incinerated bales to form bundles of high density, substantially pure ferrous scrap.

7. The process of claim 6 in which the initial compaction of said plurality of bales, prior to incineration is such that said bales are substantially free of noncommunicating pockets of combustible matter whereby said ashes of said combustible matter may be separated by agitation from the interior of said bales after incineration.

8. A method of recovering and refining scrap metal from a scrap source including metallic material and combustible matter comprising the steps of partially compacting and shearing a scrap body in a baling shear to form a plurality of scrap bales of increased density and of a reduced size capable of being conveyed to and received by a tunnel incinerator, passing said bales through said tunnel incinerator whereby the combustible matter therein is completely volatilized or reduced to ash, agitating said incinerated bales to remove the residual ash therein, and further compacting said bales to form high density bundles of substantially pure metallic scrap material.

No references cited.

HYLAND BIZOT, *Primary Examiner.*

H. W. TARRING, *Examiner.*